United States Patent [19]

Murthy et al.

[11] 4,301,827

[45] Nov. 24, 1981

[54] ACCUMULATOR WITH PRECLOSING PREVENTER

[75] Inventors: Rajam R. Murthy; Billy J. Rice, both of Houston, Tex.

[73] Assignee: Koomey, Inc., Houston, Tex.

[21] Appl. No.: 123,988

[22] Filed: Feb. 25, 1980

[51] Int. Cl.[3] .................... B67D 5/54; F16K 21/16; F16K 31/18

[52] U.S. Cl. .................... 137/207; 137/192; 137/397; 137/430; 138/26; 138/30; 222/67

[58] Field of Search .............. 137/192, 207, 397, 398, 137/399, 430, 433; 138/26, 28, 30; 222/66, 67; 220/85 B

[56] References Cited

U.S. PATENT DOCUMENTS

| | | | |
|---|---|---|---|
| 902,355 | 10/1908 | Whittaker | 137/398 |
| 1,536,686 | 5/1925 | Mullen et al. | 137/192 |
| 2,616,453 | 11/1952 | Green | 138/30 |
| 2,731,038 | 1/1956 | Purcell | 137/398 |
| 3,593,746 | 7/1971 | Allewitz | 138/30 |
| 3,782,418 | 1/1974 | Zahid | 138/30 |
| 4,080,996 | 3/1978 | Zahid | 138/30 |
| 4,112,978 | 9/1978 | Olbrich et al. | 138/30 |

*Primary Examiner*—Martin P. Schwadron
*Assistant Examiner*—G. L. Walton
*Attorney, Agent, or Firm*—Pearne, Gordon, Sessions, McCoy & Granger

[57] ABSTRACT

A guided-float accumulator suitable for use with a hydraulic system for an oil well blowout preventer is provided with a wing shut-off valve. Radially inwardly directed outlet parts are aimed at the bottom of the valve wing to generate unbalanced reaction forces which oppose the bernoulli effect forces caused by rapid movement of fluid through the chamber of the shut-off valve, thus preventing premature closing of the valve.

3 Claims, 2 Drawing Figures

ACCUMULATOR WITH PRECLOSING PREVENTER

This invention relates to accumulators for high pressure (say 3000 psi or higher) hydraulic systems such as used in oil well blowout preventer control systems. More particularly, the invention relates to accumulators of the type containing a hollow float movable on a reciprocable guide rod in the accumulator vessel to close a valve at the bottom of the vessel to prevent the escape of precharged gas (usually nitrogen) from the vessel into the hydraulic system proper when the liquid level within the vessel becomes low. The valve is located in a housing at the bottom of the vessel and is spring-biased to open position. As the vessel empties, fluid flows into and through a valve chamber defined by the housing. The weight of the float, acting through the guide rod, is relied on to overcome the bias of the valve spring and lower the seating portion of the valve into the valve seat to thereby close off flow from the valve chamber, and therefore from the vessel.

When the vessel proceeds to empty at high flow rates, the valve is subjected to hydrodynamic closing forces which tend to close the valve independently of the action of the float. Such forces are generated as rapid fluid flow within the valve chamber and past the underside of the valve seating portion subjects the valve body to the bernoulli effect.

Unless the bias of the spring is sufficiently strong to resist such hydrodynamic closing forces, the valve will close long before the vessel approaches empty condition, thus seriously interfering with intended accumulator action. On the other hand, unless the bias of the spring is sufficiently weak to be readily overcome by the weight of the float, closing action in the normal or intended manner will not be sufficiently positive. Although normal closing action can be made more positive by increasing the weight (and correspondingly the displacement) of the float, there are practical limitations to the magnitude of such increases.

In many applications of accumulators for oil well blowout preventer control systems, the result has been difficulty in avoiding preclosing while at the same time providing sufficiently positive normal closing operation.

The present invention overcomes this problem by partially or wholly neutralizing the hydrodynamic forces generated by the bernoulli effect. According to the invention, hydrodynamic forces are imposed on the valve which dynamically counteract the bernoulli forces. Such counteracting forces increase with increasing fluid flow rates, just as the bernoulli forces do, so that effective neutralizing of the bernoulli effect is maintained throughout all rates of flow.

In the practice of the invention, ports leading into the valve chamber from the accumulator vessel proper are aimed at the bottom of the valve seating portion. The so-aimed liquid is forced to change direction and, in so doing, exerts reaction forces against the valve wing. Radial components of these reaction forces balance each other, but longitudinal components act additively along the axial direction and in opposition to the bernoulli forces to thereby prevent preclosing.

The invention will be more fully understood from the following description of a specific example together with the accompanying drawings, in which.

Figure 1:
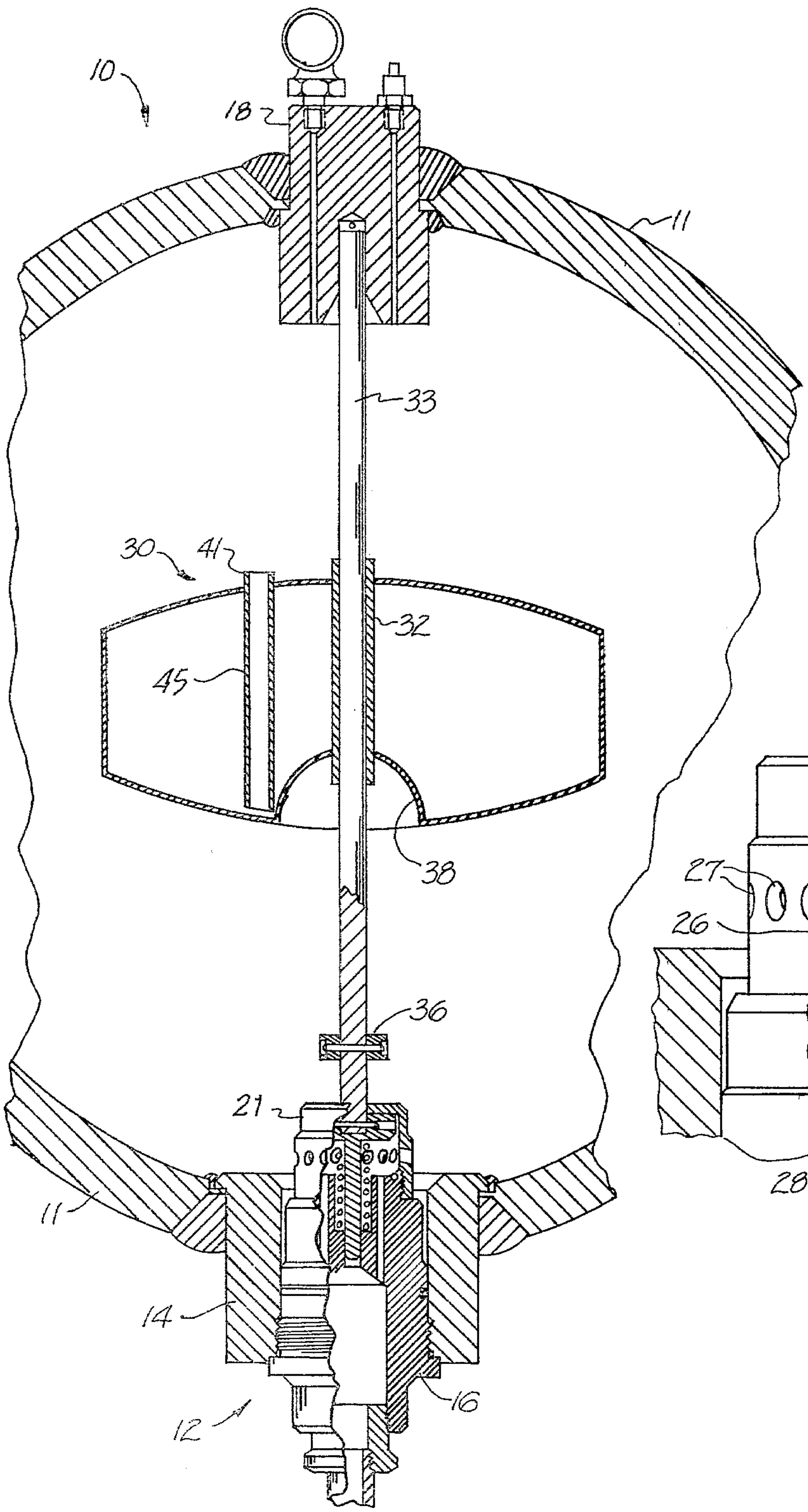
FIG. 1 is a fragmentary, vertical sectional view of an accumulator utilizing the invention.
Figure 2:
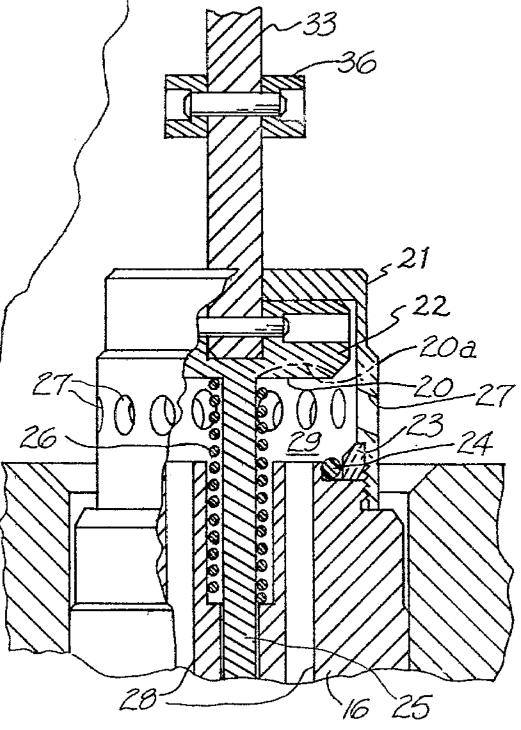
FIG. 2 is an enlarged detail view of the valve and outlet means seen in the lower part of FIG. 1.

Shown in the drawings is an accumulator 10 comprising a spherical vessel 11 having a port or mouth 12 defined by a neck 14. The mouth is closed by a plug body 16. The neck 14 is welded to the wall of the spherical vessel as shown, and the plug body 16 is threadedly engaged in the neck 14. A suitable O-ring seal is provided between the plug body and neck, as shown in FIG. 1.

Fluid outlet means and a shut-off valve are associated with the plug body 16. An upstanding housing 21 for the shut-off valve is threadedly engaged on the plug body 16. The interior of the upstanding housing 21 defines a valving chamber 29. The seating portion 22 of the valve is adapted to move up and down in the chamber 29 between a raised position as shown and a closed position. The seating portion 22 seats against a seating insert 23 and an elastomeric ring 24 to provide a pressure-tight seal in the closed position of the valve. The valve stem 25 is slidingly received in the plug body 16 and is surrounded by a valve spring 26 which biases the seating portion 22 to its raised open position, as shown.

A float 30 is mounted on a normally vertically extending guide rod 33 by a sleeve 32. A collar 36 is pinned to the guide rod in the manner shown. Within the housing 21, the guide rod 33 and valve member 22 are pinned together as shown, so that they move vertically as a unitary assembly. In the operation of the accumulator, as the level of the hydraulic fluid (not shown) falls, the float 30 moves down on the guide rod 33. As the vessel continues to empty, the bottom end of the sleeve 32 engages the collar 36 and the guide rod 33 and valve member, including seating portion 22, begin to move downwardly under the weight of the float 30 and against the bias of the valve spring. As the float 30 comes adjacent the bottom of the vessel, the valve reaches fully closed condition and seats, preventing further emptying of the vessel. A recess 38 formed in the bottom of the float accommodates the top of the valve housing 21, allowing the float 30 to closely approach the bottom of the vessel 10 before full closure. The top end of the guide rod 33 may be slidingly supported by a boss 18 at the top of the vessel 11, and the boss 18 may include pressure gauge and bleed lines, as shown.

Upon resurgence of hydraulic pressure in the system to which the accumulator is connected, the weight of the float array is overcome and the valve reopens to allow hydraulic fluid to re-enter the vessel chamber.

In order to prevent crushing of the float when the interior of the vessel 11 is pressurized, the float is provided with a vent outlet 41. The vent outlet 41 may open directly from the interior of the float or preferably, as shown, it may open from a vent line 45 whose bottom end in turn opens from the interior of the float at a low point.

The fluid outlet means for the vessel 11 includes lateral ports 27 opening from the interior of the vessel 11 into the valving chamber 29 and passageway means 28 formed in the plug body 16 and leading from the valve seat to appropriate hydraulic connections and tubing associated with the lower end of the plug body 16 at the exterior of the port or mouth 12, as shown.

According to the invention, the lateral ports 27 are aimed in the outflow direction against the lower face 20 of the valve seating portion 22. This face may be flat as shown or may be dished as shown in phantom at 20*a*, or may be otherwise shaped to enable or allow the outgoing liquid from the vessel 11 to exert dynamic thrust on the valve in the upward direction.

The hydrodynamic reaction forces in the opening direction represented by such thrust counteract the hydrodynamic closing forces generated as the vessel 11 empties at high flow rates. Thus, even though rapid fluid flow through the chamber 29 and past the underside of seating portion 22 subjects the valve to the bernoulli effect, preclosing does not occur. As the bernoulli effect increases with increasing flow rate, so do the hydrodynamic reaction forces imposed by the incoming hydraulic fluid directed toward the bottom of seating portion 22, and effective neutralizing of the bernoulli effect is maintained at all rates of flow.

As emptying of the vessel 11 approaches and the float 30 engages the collar 36, the weight of the float 30 is imposed against the bias of the spring 26 and the seating portion 22 begins to lower. As the seating portion moves lower, the face 20 passes the ports 20 and the upward thrust from outgoing fluid flowing from the ports diminishes to zero. However, bernoulli forces also diminish as the ports 27 are occluded and the rate of fluid flow decreases. In any event, the vessel 11 is already substantially empty when the valve starts to close under the weight of the float.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In a guided-float accumulator comprising a vessel in the shape of a sphere or cylinder adapted to contain a liquid topped by a highly pressurized gas, a mouth at the bottom of the vessel, fluid outlet means associated with the mouth for connection of the vessel and its contents to a hydraulic system such as used in an oil well blowout preventer, a spring-loaded normally open valve associated with the mouth in series with the fluid outlet means, an upstanding housing for the valve defining interiorly thereof a valving chamber, a valve seat at the bottom of the valving chamber and adapted to receive the seating portion of the valve to close the valve, said fluid outlet means including lateral ports opening from the interior of the vessel into said valving chamber and passageway means leading from said valve seat toward the exterior of said mouth, a float movable in the vessel along a vertical guide according to the level of the liquid fill within the vessel, said float being heavy enough to overcome the spring-loading of the shut-off valve and to thereby close off the shut-off valve and prevent the escape of pressurized gas from the vessel into the hydraulic system proper when emptying of the liquid from the vessel reaches completion, the bottom of said valve seating portion and said lateral ports being respectively shaped and aimed to direct outgoing liquid toward the bottom of said valve seating portion in the full open position of the valve to thereby impose an unbalanced upward component of dynamic thrust against the valve in addition to balanced radial components of dynamic thrust against the valve, whereby bernoulli effect forces generated by the flow of outgoing liquid are neutralized by said upward component of dynamic thrust, said upward imposing of dynamic thrust continuing during emptying of said vessel from any wholly or partially full condition at least to the point approaching completion of emptying at which the spring-loading of the valve commences to be overcome by said float.

2. A device as in claim 1, in which a substantial portion of the bottom face of said valve seating portion is generally horizontal and said lateral ports are aimed upwardly in the outflow direction.

3. A guided-float accumulator comprising a high-pressure vessel for containing a liquid topped by a highly pressurized gas, a spring-loaded normally open valve at the bottom of the vessel, a housing for the valve at the bottom of the vessel defining a valve chamber, a valve seat at the bottom of the valve chamber, fluid outlet means including lateral outlet ports opening from the interior of the vessel to the interior of the valve chamber and passageway means leading from the valve seat to exterior connections, and float means heavy enough to overcome the spring-loading of the valve as emptying of liquid from said vessel approaches completion, the bottom of the seating portion of said valve and said lateral ports being respectively shaped and aimed to direct outgoing liquid toward the bottom of said valve seating portion in the full open position of the valve to thereby impose an unbalanced upward component of dynamic thrust against the valve in addition to balanced radial components of dynamic thrust against the valve, whereby bernoulli effect forces generated by the flow of outgoing liquid are neutralized by said upward component of dynamic thrust, said upward imposing of dynamic thrust continuing during emptying of said vessel from any wholly or partially full condition at least to the point approaching completion of emptying at which the spring-loading of the valve commences to be overcome by said float means.

* * * * *